United States Patent
Berg et al.

(10) Patent No.: US 7,503,034 B2
(45) Date of Patent: Mar. 10, 2009

(54) METHOD AND SYSTEM FOR DYNAMICALLY MAPPING ARCHIVE FILES IN AN ENTERPRISE APPLICATION

(75) Inventors: Daniel C. Berg, Cary, NC (US);
Michael L. Fraenkel, Cary, NC (US);
Martin P. Nally, Dana Point, CA (US);
Lawrence S. Rich, Cary, NC (US);
Ritchard L. Schacher, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 10/284,633

(22) Filed: Oct. 31, 2002

(65) Prior Publication Data

US 2004/0088681 A1 May 6, 2004

(51) Int. Cl.
G06F 9/44 (2006.01)
G06F 15/177 (2006.01)
(52) U.S. Cl. ................. 717/120; 709/220; 709/222
(58) Field of Classification Search ......... 717/120, 717/110; 709/224, 225, 220, 222; 707/104
See application file for complete search history.

(56) References Cited

U.S. PATENT DOCUMENTS

| 6,083,282 | A  | * | 7/2000  | Caron et al. ........... 717/101 |
| 6,105,036 | A  | * | 8/2000  | Henckel ............. 707/104.1 |
| 6,230,318 | B1 |   | 5/2001  | Halstead et al. ........ 717/10 |
| 6,393,437 | B1 |   | 5/2002  | Zinda et al. .......... 707/201 |
| 6,430,599 | B1 |   | 8/2002  | Baker et al. .......... 709/203 |
| 6,671,720 | B1 | * | 12/2003 | Cheston et al. ........ 709/222 |
| 6,735,638 | B2 | * | 5/2004  | Hisano ................ 710/5 |
| 7,000,238 | B2 | * | 2/2006  | Nadler et al. ......... 719/330 |
| 7,069,547 | B2 | * | 6/2006  | Glaser ............... 717/154 |
| 7,099,939 | B2 | * | 8/2006  | von Klopp et al. ...... 709/224 |
| 7,185,071 | B2 | * | 2/2007  | Berg et al. ........... 709/220 |
| 2002/0184610 | A1 | * | 12/2002 | Chong et al. ......... 717/109 |
| 2003/0084425 | A1 | * | 5/2003  | Glaser ............... 717/110 |
| 2003/0217140 | A1 | * | 11/2003 | Burbeck et al. ........ 709/224 |

OTHER PUBLICATIONS

E. Swierk et al., "The Roma personal metadata service", Third IEEE Workshop on Mobile Computing Systems and Applications (WMCSA'00) 10 pages, "http://mosquitonet.stanford.edu/publications/Roma-WMCSA2000.pdf".*

(Continued)

Primary Examiner—Wei Y Zhen
Assistant Examiner—Chih-Ching Chow
(74) Attorney, Agent, or Firm—Saul Ewing LLP

(57) ABSTRACT

Mapping information that describes the mapping of referenced projects to their container project is included in the container project, using a "module mapping" file. A module mapping file is a simple meta-data file, for use at development time only, which stores data that maps relative URIs to IDE project names. The module mapping file contains entries for the location of nested archives, relative to the virtual archive defined by the container project, mapped to the uniquely named referenced project within the IDE. The paths of the archive files are computed "on the fly" just before the application server is started, rather than being simply written into an extensions file, located within the container project, in a fixed form when the enterprise application is written/developed.

12 Claims, 2 Drawing Sheets

OTHER PUBLICATIONS

Figure 1:
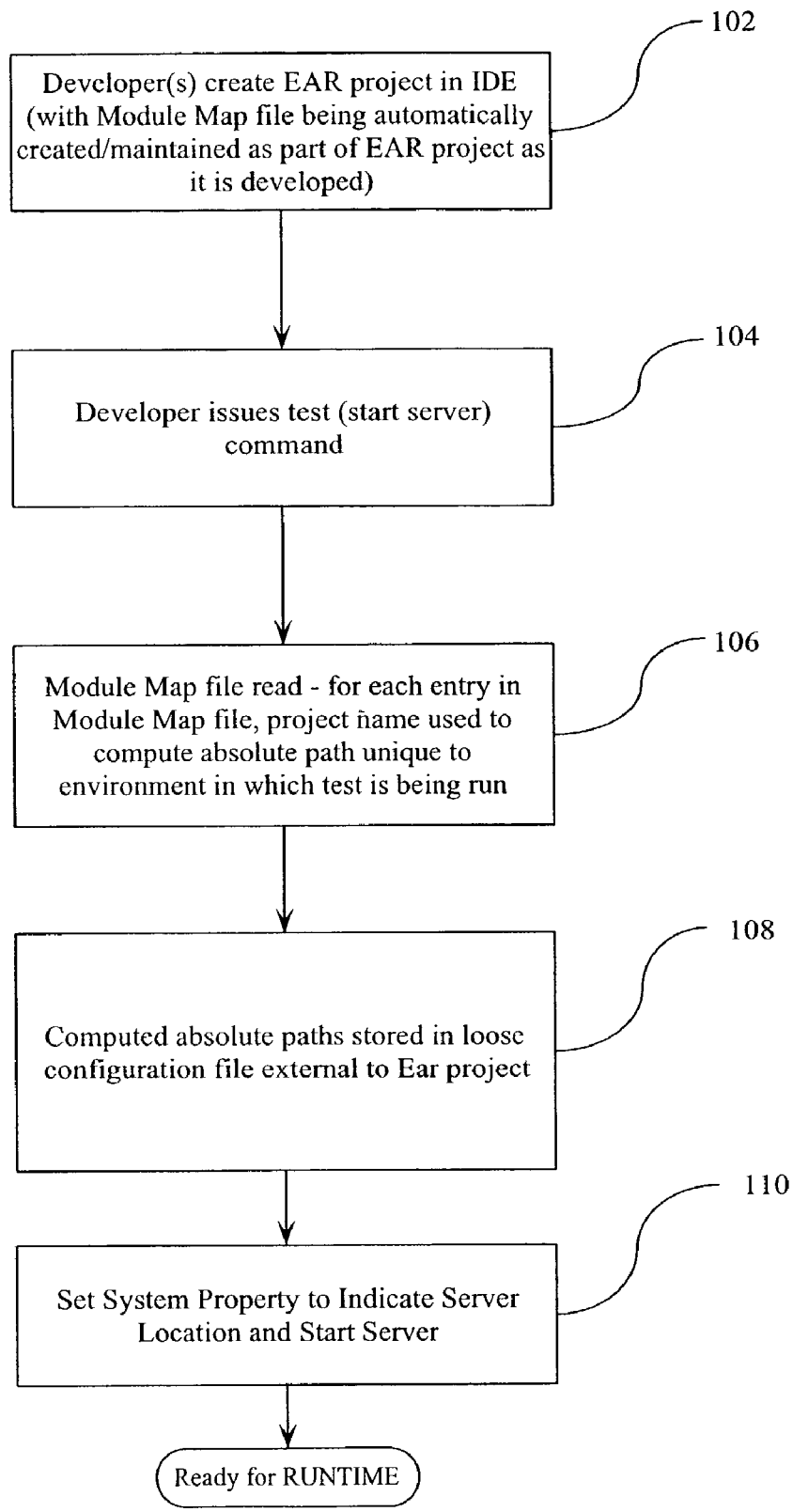

Lagoze, "The Warwick Framework, A Container Architecture for Diverse Sets of Metadata", D-Lib Magazine, Jul./Aug. 1996, ISSN 1082-9873, "http://www.dlib.org/dlib/july96/lagoze/07lagoze.html", 11 pages.* deBoer, "Developing *J2EE* utility JARs in WebSphere® Studio Application Developer," IBM Toronto Lab, pp. 1-7, http://www.7b.software.ibm.com/wsdd/library/techarticles/0112_deboer/deboer2.html (Dec. 2001).

* cited by examiner

METHOD AND SYSTEM FOR DYNAMICALLY MAPPING ARCHIVE FILES IN AN ENTERPRISE APPLICATION

BACKGROUND OF THE INVENTION

1. Field of the Invention

The present invention relates to the field of computer system interfaces and, more particularly, to the integration between programmer-integrated-development environments (IDEs) and application servers.

2. Description of the Related Art

As is well known, computer files are stored in a storage medium (e.g., disk) using a directory structure. The "address" of a file is the storage location from where it can be retrieved and typically comprises one or more directory segments and a file name. This address is referred to as the "absolute path" of the file. As an example, in a Windows environment, the absolute path "D:\Workspace\Projects\ExampleApplication" identifies a file with the filename "ExampleApplication" stored on the "D drive" of a Windows-based computer in the subdirectory "Projects" of the directory "Workspace".

The Java 2 Platform Enterprise Edition (J2EE) specification defines a standard architecture that has received widespread industry support and growing customer acceptance, and increased investment focus has been placed on J2EE technology by the industry. In accordance with the Sun J2EE specification, an enterprise application is packaged in a well known archive file format, and the packaged application is called an Enterprise Archive, or EAR file. A typical J2EE application comprises multiple archive files, referred to as "modules" and "utility JARs." These archives may also be known as "nested" archives. When an enterprise application is deployed on an application server, it is common for the top level EAR file to be expanded into a directory structure on disk. The nested archives in the expanded EAR file are then located as files or directories directly under the root directory location of the EAR file.

A module in the context of J2EE architecture is a specialized kind of JAR file, containing Java classes and a deployment descriptor. A deployment descriptor is a configuration file that contains deployment information instructing an application server running the program how to deploy the enterprise application. A utility JAR file is a common JAR file that contains compiled Java classes that are referenced by Java classes in one or more other module or JAR files in the enterprise application. As noted above, all modules and utility JARs are relative to the EAR file that contains them.

It is not uncommon for the nested JAR files to themselves contain nested JAR files. An example is a WAR file as described in the Sun Java Servlet Specification, v2.2, by Sun Microsystems (Dec. 17, 1999). In addition to web pages and other assorted files (e.g., graphics), a WAR file may contain "libraries", which are JAR files containing compiled programming code to be utilized by the web application.

IDEs often make use of the concept of a "project". A project can be defined as a collection of files grouped together under a common project name for a common development effort. Typically all files in a project are stored relative to a single directory in the file system. The environment can contain many projects. A flexible IDE will allow a project to exist in any location on the file system.

Most IDEs can be extended by specialized developer tools. For example, tools exist which layer over a base IDE to provide support for J2EE application development. Additionally, these tools can deploy developed J2EE applications on an application server locally installed within the IDE. In an optimal environment, the application server will run the applications using the files as they are stored in the IDE, so that the programmer can debug and modify the original files.

A problem arises, however, because the directory structure and project locations in the IDE do not fit the J2EE mold. For example, the IDE can create one project for an EAR file, and separate "referenced" projects for each module and utility JAR file in the EAR file. Each of these projects can be located in an arbitrary location, which is external to the EAR project. The highest-level project, (the project that "contains" the nested archives, or contains references to other projects that conceptually represent nested archives) is referred to generically as a "container project". Two examples of container projects in a J2EE environment are EAR projects, that represent enterprise applications or EAR files, and Web projects, that represent web applications or WAR files. The application server, however, expects the files to be in a hierarchical directory structure as noted above. Moreover, the location of these externally-stored referenced projects may differ from one developer's machine to the next (also a function of flexibility in the IDE), and the referenced file would therefore be difficult to find by the container project. Therefore, a solution is needed which integrates the development environment with the application server such that the server can use the files as they exist in the projects of the development environment.

A sub-optimal solution is to copy the contents of the project in the IDE into a separate EAR file, and launch the server on that file. This involves actually generating a deployed EAR file from the project contents in the IDE for the Enterprise Application. This external EAR file is then installed and started on the application server. This solution is not optimal because of the duplication of files, and because the developer is not able to debug the original files (those that are actually being developed), but instead can only debug the copies. Many existing application server tools currently use this approach.

Another solution developed for use with Websphere by IBM involves the concept of "loose files", also known as "loose modules" or "loose archives." Loose files are simply files that are stored outside of the directory structure of the expanded EAR, i.e., they are not contained in a subdirectory of the EAR. Examples of loose archives include the above described project references from an EAR project to a project that represents a J2EE module or utility JAR, and references from a J2EE web project to a project that represents a library in a WAR file. In this solution, rather than store the nested archive contents within the file structure of the EAR file, contents are placed in separate projects. This enables the tools to adapt the project structure of the IDE to compose an enterprise application for deployment.

It is quite common for tool and application server vendors to store additional meta-data in an additional file inside a J2EE archive. This meta-data may contain runtime information that goes above and beyond the standard specification. This vendor specific file is called an "extensions" file, because it extends the specification.

To coordinate the interaction between projects making up an enterprise application and mapping the loose files for use at runtime, prior art systems utilize the above-described file structure and use the extensions file of a container project (e.g., EAR project) to store the absolute paths of the referenced projects. Thus, for example, a tag in a file in a particular project directs the application server running the enterprise application to retrieve particular content from a particular absolute address. As long as the address information of the file is a valid address for the machine on which the enterprise application is running, the enterprise application will function properly.

This implementation has known limitations, however. For one, it is not "team friendly". For example, suppose Developer A stores files pertaining to the development of enterprise application "X" at a location/path "C:\Workspace" on his workstation. Assume further that Developer D stores files related to development of enterprise application X on her computer at a location/path "Q:\Workspaces\Development\Workspace." During development of the EAR for enterprise application X, the system places a tag in the application extensions file that directs the enterprise application to retrieve a web module that has an absolute path of C:\Workspace\ExampleWeb\WebContent. Developer A then stores the EAR project, and all its referenced projects, into a repository used by the team members for development purposes.

Now Developer B retrieves the EAR project, and all its referenced projects from the repository and loads it into her workspace. Since the tag in the extensions file will point to a non-existent or invalid location relative to Developer B's computer (C:\Workspace\ExampleWeb\WebContent) the test will fail and indicate that the path is non-existent.

Tools exist to correct this problem. Specifically, developers'tools can identify the existence of an incorrect path and replace it with the correct path, which is derived by the IDE. For example, the developer's tools can locate Developer B's workspace and update the tag to direct it to the absolute path Q:\Workspaces\Development\Workspace\ExampleWeb\WebContent, which is where the file "WebContent" will be found. However, this modifies the original extensions file in the EAR project. Developer B may either discard this updated file when testing is completed (which will require the same process to be followed the next time Developer B attempts to test the EAR) or the modified file can be saved and checked into the repository, which will cause a similar problem for Developer A next time he attempts to test the file. This is time-consuming for the developer, and also creates confusion for the developer. The confusion arises because whenever the file is modified, it is marked as "dirty" (modified) and in need of synchronization with the repository. The developer sees this visual cue and must make a decision to either ignore it or check the file into the repository. Moreover, if any valid changes are also made in the extensions file, then when the developer goes to synchronize the file with the repository, the valid differences must be differentiated from the changes made only as a result of the absolute paths.

The inclusion of the absolute paths also presents a problem when the EAR file is exported from the development environment to be deployed on a live production server. Since these absolute paths are only utilized for testing, the absolute paths must be removed from the extensions file contained in the EAR file as part of the process of packaging the EAR for deployment. If the absolute paths are not stripped out of the EAR file, then the running production server (the server running the deployment version) will try to load nested archives from these now-non-existent absolute locations, causing an error. This implies that developers are required to use the export tools provided for packaging the EAR. In some instances, however, developers may prefer to use their own customized program scripts to package the EAR, instead of the provided tools. In this case, the developer would need to be aware of the absolute path tags in the extensions file and would need to also have special code to strip these tags during packaging.

SUMMARY OF THE INVENTION

In accordance with the present invention, mapping information that describes the mapping of referenced projects to their container project is included in the container project, using a "module mapping" file. A module mapping file is a simple meta-data file, for use at development time only, which stores data that maps relative Universal Resource Identifiers ("URIs") to IDE project names. This module mapping data is informational in nature and does not, by itself, affect the program operation. It is not required or used by the runtime application in the container project or the application server; it is only "development time"meta information. The module mapping file does not contain absolute paths, i.e., the location of the files is not included in the metadata information that comprise the module mapping file. Instead it contains entries for the location of nested archives, relative to the virtual archive defined by the container project, mapped to the uniquely named referenced project within the IDE.

When the developer starts the application server within the test environment, the development tool reads the module map file at that time and computes the absolute addresses of the nested archive files, which are represented by referenced projects, relative to the environment (e.g., the machine) in which the application server is running. These absolute paths are then stored in a loose configuration file, i.e., they are stored in a file, the location of which is outside of all projects within the IDE. As a result, the paths of the archive files are computed "on the fly" just before the application server is started, rather than being simply written into an extensions file, located within the container project, in a fixed form when the enterprise application is written/developed. If the file directory structure used to create the initial set of projects differs from the file directory structure on which the application is currently running, by computing the absolute paths of the archive files at the time the application is being run, the system will always have the appropriate absolute path of the archive files.

In addition, since the computed absolute paths are stored in a loose configuration file that is thus outside of the container project, the container project itself is not modified. Therefore, the application can be tested/run on multiple machines without the need to modify the container project. In addition, the module mapping file has no impact on the operation of the deployment version of the program, and the absolute paths are no longer written to the extension file. Therefore all the files can exist in the same form in both the IDE and the deployed EAR, and there is no need to strip any absolute path information when the deployment version of the application is created.

DETAILED DESCRIPTION OF THE DRAWINGS

Figure 2:
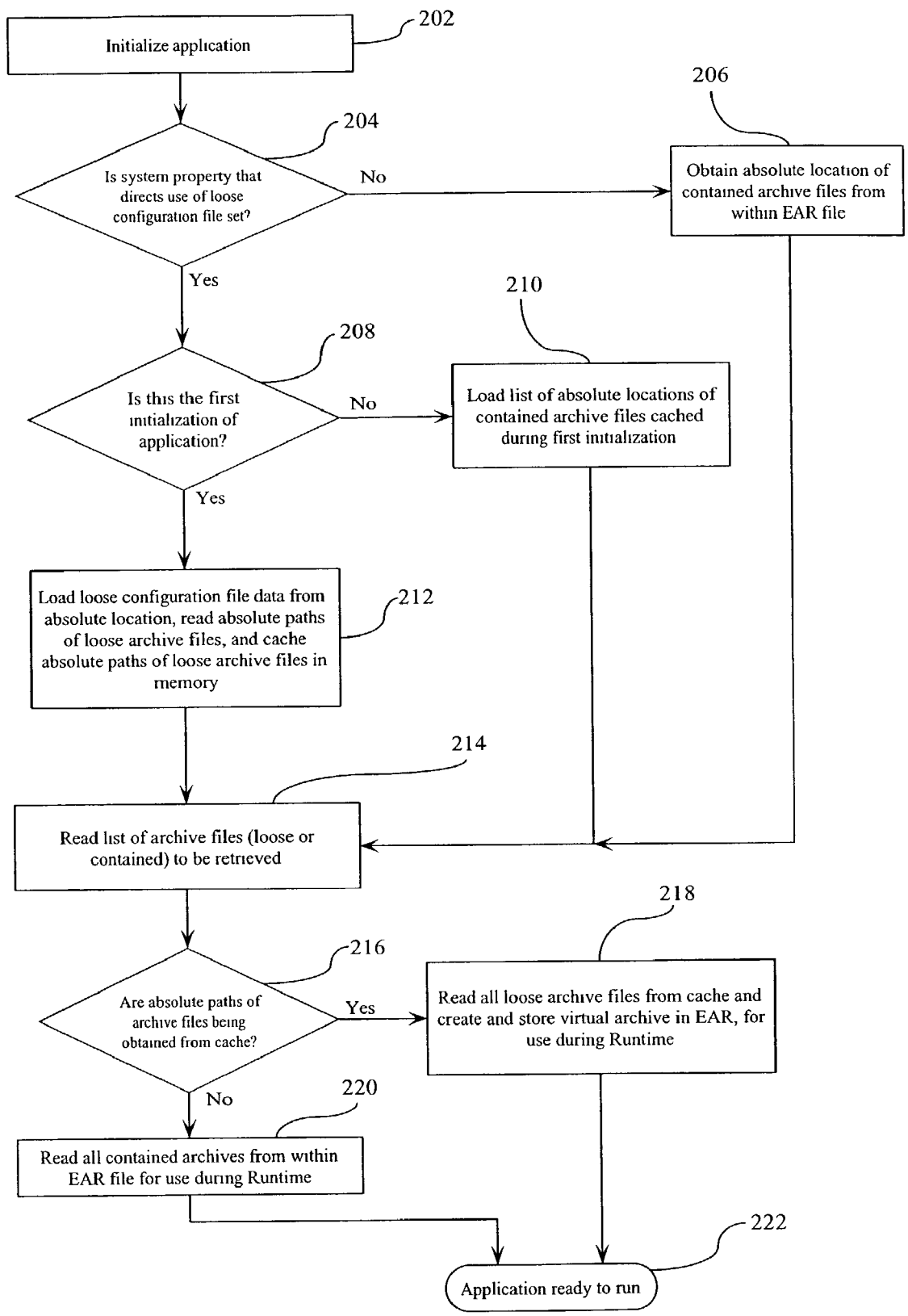

FIG. 1 illustrates the general steps performed by an IDE tool prior to the startup of a test application server program to enable the server to operate in accordance with the present invention; and FIG. 2 illustrates an example of steps performed, in accordance with the present invention, once an EAR file generated by an EAR project is initialized.

DETAILED DESCRIPTION OF PRESENTLY PREFERRED EMBODIMENTS

FIG. 1 illustrates the general steps performed by the IDE tools prior to startup of a test application server program, to enable the server to operate according to the present invention, using the location of application files as they exist in the IDE.

Referring to FIG. 1, at step 102, the developer begins by either developing a new container project or by using an existing container project. As is well known, the container project will typically identify multiple referenced projects and direct their interaction between each other. Each referenced project is mapped to a URI including a file name and possibly one or more directory/subdirectories.

As a container project is developed in the IDE, a module mapping file is continuously updated with the aforementioned mapping information.

At step 104, as part of the testing process, the developer issues a test (start server) command to commence testing of one or more applications in projects in the IDE. In accordance with the present invention, at step 106, the module map file is read, and for each entry in the module map file, the absolute path for each referenced project identified in the module map file is computed, relative to the environment in which the container project is being run (at this stage, the IDE).

In accordance with the present invention, these computed absolute paths are stored in a loose configuration file external to the container project.

If the server is being started to test multiple container projects, the IDE reads the module map for each container project, and the aggregate set of absolute paths for all container/referenced projects is stored in one loose configuration file. Thus, external to the container project, the loose configuration file will contain information that maps the relative URI of these "loose archives" in the container to their absolute locations. In other words, a loose archive maps to an individual project, the absolute path of which is stored for use by the server when running the application. Once step 108 is completed and the absolute paths are stored in the loose configuration file, a system property is set to indicate to the server the location of the stored loose configuration file (step 110). Once this has been completed, the EAR projects are ready to be run in the runtime environment, described with reference to FIG. 2.

The absolute paths are not established until right before they are used during runtime, thereby assuring that the absolute path will function in the environment of and on the system operating the enterprise application. Further, since the container project is not modified, when a different developer attempts to run the application for testing on a different machine, the absolute paths established and stored in the loose configuration file will be appropriate for that machine.

FIG. 2 illustrates an example of steps performed, in accordance with the present invention, when an EAR file (actually the directory of the EAR project) is initialized. At step 202, an action is performed to cause the EAR file to initialize in a well known manner. This can comprise, for example, the startup process of the application server. At step 204, a determination is made as to whether or not there is a system property set that directs the use of a loose configuration file for creation and storage of the absolute path of nested archives. The system property will direct the application server to use either the loose configuration file for obtaining the absolute address of the loose archive files or (if the property is not set) to obtain the absolute address of the "contained" archive files from the EAR file itself (i.e., the address will be contained relative to the EAR, as opposed to being "loose", i.e., outside of the EAR file). The use of system properties to make determinations and execute alternative instructions is well-known and is not discussed further herein.

If, at step 204, a determination is made that the system property is not set (meaning that the application server will use prior art methods for obtaining the nested archives), at step 206, the absolute location of the archive files are obtained from within the EAR file and then the process proceeds to step 214, described more fully below.

If at step 204 a determination is made that the system property is set to direct the loading of absolute paths from a loose configuration file, at step 208 a determination is made as to whether or not this is the first initialization of any application. If it is not the first initialization, a list of absolute locations of the nested archive files will already have been cached from the previous startup of an application. The server can run many applications, but there exists one loose configuration file with the absolute paths for all applications. The loose configuration file is actually modeled as a series of objects. Thus, if this is not the first initialization of an application, there will already exist in memory a representation of the loose configuration file with the loose configuration information for all applications. Thus, at step 210, a list is loaded of the absolute location of the nested archive files from the cache (which updates the loose configuration file) and the process then proceeds to step 216.

If at step 208 it is determined that this is the first initialization of an application, the in-memory representation of the loose configuration file must be created. Thus, the server process proceeds to step 212, where the loose configuration file is read to identify the absolute path information for the nested archive files.

At step 212, the loose configuration file data is loaded from the absolute location outside the container (the expanded EAR); this location is read from the previously noted system property. The absolute paths of the nested archive files are read and cached in RAM. Caching of the file in RAM eliminates the need to reload and reparse the file each time information from the loose configuration file needs to be accessed. At step 214, a list of nested archive files that need to be retrieved is computed, and at step 216, a determination is made as to whether or not the absolute paths of the nested archive files are being obtained from the cache or from directly within the container. If it is determined that the absolute paths are being obtained from the container itself, at step 220, the absolute paths are obtained from the container (according to the prior art method) and then the process proceeds to step 222, where the application is ready to be run by the application server.

If, at step 216, it is determined that the absolute paths of the loose archives are being obtained from the cache, then at step 218 a list of the absolute paths from the cache is read and a virtual archive is constructed for each entry in the cache, using the absolute path in the cache. These virtual archives are stored in the container archive in memory for use during runtime. At step 222, the process is finished initializing, and the application and modules are prepared and ready for loading, serving and executing the files contained within. The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation being used by a developer. In a client/server environment, such software programming code may be stored with storage associated with a server. The software programming code may be embodied on any of a variety of known media for use with a data processing system, such as a diskette, or hard drive, or CDROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

In a preferred embodiment, entries for the location of nested archives can include entries for both loose archives and contained archives, that is, for loose archives that fall outside of the directory structure of the container and contained archives that lie within the directory structure of the container. This can be useful because large-scale applications typically include many utility JARs. Some, but not all, of these utility JARs may be "off the shelf" components, i.e., third-party components that are used for reference by the application code but which will never be modified by the development team. In such cases, it is simpler for the development team to store these never-to-be-modified JARs directly in the container project as JAR files, as opposed to expanding them in separate, referenced projects. The use of separate referenced projects should optimally be used for modules and utility JARs actively developed and managed in house by the development team. In other words, archives that will never be modified can be stored in the container project, and archives that may be modified can be stored in the loose modules. In such an embodiment, the application server constructs an in-memory representation of the container archive, the list of nested archives of which is the sum of the loose archives and the contained archives.

Further, while in a preferred embodiment the module map is used only during development time, the present application should not be construed as being so limiting, and it is understood that module mapping files could instead be generated at runtime during the installation of an enterprise application, and such an embodiment falls within the scope of the present claimed invention.

To summarize, the test environment will load, serve, and execute the files in the projects just as if they were contained in an EAR file or an expanded EAR directory structure, even though the files may be distributed in many disjoint locations on the file system. All of this is accomplished without storing absolute paths anywhere within the archive projects or the EAR project. This method allows files to be easily tested without modification, enables full access to members of a development team without requiring that files be modified, and simplifies the transition from the development environment to the runtime environment.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A method of mapping referenced projects in an IDE (Integrated Development Environment) version of a software program to a container project associated with the referenced projects, comprising the steps of:

creating a module mapping file containing mapping information for said referenced projects relative to said container project, said module mapping file storing data that maps relative URI's to IDE project names;

storing said module mapping file in said container project;

configuring the IDE version of the software program to read said module mapping file upon start-up of an application server running said IDE version of the software program, whereby path(s) of each referenced project are computed upon said reading of said module mapping file, said paths identifying absolute addresses on a machine on which said IDE version of the software program and application server are running; and storing said computed path(s) in a loose configuration file external to said container project on said machine; and using said computed paths by said application server to determine locations from which to load application files.

2. The method of claim 1, wherein said module mapping file comprises a metadata file.

3. The method of claim 2, wherein said module mapping file is used only during development time.

4. The method of claim 3, wherein said mapping information comprises data that maps relative Universal Resource Identifiers ("URIs") of said reference projects to project names of said container project.

5. A system for mapping referenced projects in an IDE (Integrated Development Environment) version of a software program to a container project associated with the referenced projects, comprising:

a processor; and means for creating a module mapping file containing mapping information for said referenced projects relative to said container project, said module mapping file storing data that maps relative URI's to IDE project names;

means for storing said module mapping file in said container project;

means for configuring the IDE version of the software program to read said module mapping file upon start-up of an application server running said software program, whereby path(s) of each referenced project are computed upon said reading of said module mapping file, said paths identifying absolute addresses on a machine on which said IDE version of the software program and application server are running; and means for storing said computed path(s) in a loose configuration file external to said container project on said machine;

wherein said computed paths are used by said application server to determine locations from which to load application files.

6. The system of claim 5, wherein said module mapping file comprises a metadata file.

7. The method of claim 6, wherein said module mapping file is used only during development time.

8. The method of claim 7, wherein said mapping information comprises data that maps relative Universal Resource Identifiers ("URIs") of said reference projects to project names of said container project.

9. A computer program product recorded on computer readable medium for mapping referenced projects in an IDE (Integrated Development Environment) version of a software program to a container project associated with the referenced projects, comprising:

computer readable means for creating a module mapping file containing mapping information for said referenced projects relative to said container project, said module mapping file storing data that maps relative URI's to IDE project names;

computer readable means for storing said module mapping file in said container project;

computer readable means for configuring the IDE version of the software program to read said module mapping file upon start-up of an application server running said IDE version of the software program, whereby path(s) of each referenced project are computed upon said reading of said module mapping file, said paths identifying absolute addresses on a machine on which said IDE version of the software program and application server are running; and computer readable means for storing said computed path(s) in a loose configuration file external to said container project on said machine;

wherein said computed paths are used by said application server to determine locations from which to load application files.

10. The computer program product as set forth in claim 9, wherein said module mapping file comprises a metadata file.

11. The computer program product as set forth in claim 10, wherein said module mapping file is used only during development time.

12. The computer program product as set forth in claim 11, wherein said mapping information comprises data that maps relative Universal Resource Identifiers ("URIs") of said reference projects to project names of said container project.

* * * * *